(12) United States Patent
Mashimo et al.

(10) Patent No.: US 7,406,433 B2
(45) Date of Patent: Jul. 29, 2008

(54) EVENT INVITATION METHOD AND SYSTEM

(75) Inventors: Seiichi Mashimo, Kawasaki (JP);
Kuniaki Ikematsu, Kawasaki (JP);
Hiroyuki Hatta, Kawasaki (JP); Hisashi Haseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 980 days.

(21) Appl. No.: 10/090,742

(22) Filed: Mar. 6, 2002

(65) Prior Publication Data
US 2002/0138325 A1    Sep. 26, 2002

(30) Foreign Application Priority Data
Mar. 22, 2001    (JP)    ............................. 2001-082314

(51) Int. Cl.
*G06F 9/46*    (2006.01)
(52) U.S. Cl. ........................................... 705/9
(58) Field of Classification Search ........................ 705/9
See application file for complete search history.

(56) References Cited

U.S. PATENT DOCUMENTS

| | | | |
|---|---|---|---|
| 5,790,974 A * | 8/1998 | Tognazzini | 455/456.5 |
| 6,016,478 A * | 1/2000 | Zhang et al. | 705/9 |
| 6,085,166 A * | 7/2000 | Beckhardt et al. | 705/9 |
| 6,101,480 A * | 8/2000 | Conmy et al. | 705/9 |
| 6,240,396 B1 * | 5/2001 | Walker et al. | 705/26 |
| 6,405,242 B1 * | 6/2002 | Watanabe et al. | 709/205 |
| 6,732,080 B1 * | 5/2004 | Blants | 705/9 |
| 6,779,720 B2 * | 8/2004 | Lewis | 235/382 |
| 2002/0131565 A1 * | 9/2002 | Scheuring et al. | 379/88.19 |

OTHER PUBLICATIONS

Dialog "Organize Online.(Company Business and Marketing)", Mar. 9, 1999, PC Magazine, Dialog file 16, Accession No. 06121547.*

* cited by examiner

*Primary Examiner*—Romain Jeanty
(74) *Attorney, Agent, or Firm*—Staas & Halsey LLP

(57) ABSTRACT

An event invitation method according to this invention comprises the steps of acquiring position information of a customer registered in advance; judging whether or not information concerning an invitation to an event to a terminal of the customer based on at least a positional relationship between the customer and a site of the event; and sending information concerning the invitation to the event to the terminal of the customer if it is judged that the invitation to the event should be sent to the customer. With this method, for example, by sending event invitation information to customers who can reach the event site by the opening time or ending time of the event, collection of customers who attend the event and resale of canceled tickets can be performed efficiently.

4 Claims, 18 Drawing Sheets

| TICKET RESALE ||
|---|---|
| PURCHASE NUMBER | _____ |
| NUMBER OF TICKETS YOU WOULD LIKE TO RESELL | _____ SHEETS |

FIG. 4

| PURCHASE NO. | 123456 |
|---|---|
| REGISTRATION NO. OF PERFORMANCE | 123 |
| TITLE OF PERFORMANCE | XYZ |
| DATE OF PERFORMANCE | 00:00/XX/YY/2001 |
| TEL NO. OF MEMBER | 090-000-0000 |
| NAME OF MEMBER | JOHN SMITH |
| MEMBER NO. | 123456 |
| E-MAIL ADDRESS | smith@abc.ne.jp |
| PURCHASED SEAT TYPE – 1 | "S" OR "A" OR "B" |
| 1st NUMBER OF PURCHASED TICKETS | AA SHEETS |
| PURCHASED SEAT TYPE – 2 | "S" OR "A" OR "B" |
| 2nd NUMBER OF PURCHASED TICKETS | BB SHEETS |

FIG. 5

| | |
|---|---|
| WAITING | |
| REGISTRATION NUMBER OF PERFORMANCE | _____ |
| SEAT TYPE ☐ S ☐ A ☐ ARBITRARY SEAT TYPE | |
| NUMBER OF TICKETS YOU WOULD LIKE TO PURCHASE | _____ SHEETS |

FIG. 6

| | |
|---|---|
| REGISTRATION NO. OF PERFORMANCE | 123 |
| TITLE OF PERFORMANCE | XYZ |
| DATE OF PERFORMANCE | 00:00/XX/YY/2001 |
| TEL NO. OF MEMBER | 090-000-0000 |
| NAME OF MEMBER | BILL JORDAN |
| MEMBER NO. | 123456 |
| E-MAIL ADDRESS | jordan@cdf.ne.jp |
| DESIRED SEAT TYPE | "S" OR "A" OR "ARBITRARY SEAT TYPE" |
| DESIRED NUMBER OF TICKETS | ZZ SHEETS |

FIG. 7

PERFORMANCE OF CDE

00 : 00 ON JANUARY 1ST, 2001

FG PUBLIC HALL

1. PURCHASE CONFIRMATION
   - ☐ YES
   - ☐ NO
2. DESIRED SEAT TYPE    [THIS IS SEAT TYPE WHEN YOU REGISTERED]
   A SEAT

3. ALLOWABILITY OF CHANGE OF SEAT TYPE
   [WHETHER CHANGE IS ALLOWABLE WHEN NUMBER OF REMAINING SEATS IS SMALL]
   - ☐ YES
   - ☐ NO
4. DESIRED NUMBER OF TICKETS   [THIS IS NUMBER OF TICKETS WHEN YOU REGISTERED]
   2 SHEETS
5. MINIMUM DESIRED NUMBER OF TICKETS
   [      ] SHEETS
6. OPTIMUM ROUTE
   - A STATION → B STATION → C STATION
   - ROUGHLY ESTIMATED TIME REQUIRED
   - FARE
7. SEPARATE SENDING OF TICKETS   (ONLY PERSON WHO REQUESTS)
   - NUMBER OF TICKETS
     [      ] SHEETS
   - E-MAIL ADDRESS FOR TICKET DESTINATION
     [                    ]

[ SEND ]

FIG. 10

DEAR MR. JORDAN

NOTICE OF TICKETS ASSIGNMENT

- NOTES -

PERFORMANCE OF CDE
               00 : 00 ON JANUARY 1ST, 2001
FG PUBLIC HALL
        2   SHEETS

- TICKET ISSUANCE PROCEDURE
    ..................................................

- ABOUT CHARGE SETTLEMENT
    ..................................................

THANK YOU FOR USING OUR SERVICE.

FIG. 11

| NAME OF STATION | SHIBUYA STATION |
|---|---|
| ADDRESS | 1-2-3 SHIBUYA, SHIBUYA-KU, TOKYO |
| NAME OF RAILROAD ROUTE | YAMANOTE LINE |
| LATITUDE / LONGITUDE | N XXX. XX. XX / E XXX. XX. XX |
| TIME REQUIRED TO CLOSEST STATION OF EVENT PLACE | 25 MINUTES |

FIG. 16

| NAME OF EVENT PLACE | FG PUBLIC HALL |
|---|---|
| ADDRESS | 2-15-22 OYAMADAI, MINATO-KU, TOKYO |
| LATITUDE / LONGITUDE | N XXX. XX. XX / E XXX. XX. XX |
| CLOSEST STATION 1 | YAMANOTE LINE   IKEBUKURO STATION |
| TIME REQUIRED FROM CLOSEST STA. 1 TO EVENT PLACE | 10 MINUTES |
| CLOSEST STATION 2 | SUBWAY MARUNOUCHI LINE   TORANOMON STATION |
| TIME REQUIRED FROM CLOSEST STA. 2 TO EVENT PLACE | 5 MINUTES |

| INITIAL SETTING OF NOTIFICATION AREA |  |
|---|---|
| FOR RESALE OF CANCELED TICKETS |  |
| LATITUDE & LONGITUDE OF EVENT PLACE | + 2. 00. 00 |

FIG. 17

| NO | CONDITIONS OF START (NUMBER OF HOURS BEFORE OPENING TIME) | PROCESSING TIMINGS (NUMBER OF TIMES / HOUR) | NARROWING SETTINGS OF NOTIFICATION AREA |
|---|---|---|---|
| 1 | 6 | 1 | −20 MINUTES |
| 2 | 3 | 2 | −10 MINUTES |
| 3 | 1 | 6 | −3 MINUTES |
|  |  |  |  |

FIG. 18

| SETTING OF WALK-ACCESSIBLE AREA |  |
|---|---|
| LATITUDE & LONGITUDE OF EVENT PLACE | + 0. 01. 00 |

FIG. 19

| MEMBER NO. | 123456 |
|---|---|
| NAME OF MEMBER | JOHN SMITH |
| PRESENT LAT. / LONG. | N XXX. XX. XX / E XXX. XX. XX |
| CLOSEST STATION | EBISU STATION |
| PRESENT TIME | 00:00 |

FIG. 21

| RANKING | MEMBER NUMBER | NUMBER OF TIMES OF REGISTRATION | NUMBER OF TIMES OF PURCHASE |
|---|---|---|---|
| 01 | ○××○○ | 15 | 6 |
| 01 | ○×○×○ | 15 | 5 |
| 02 | ×○×○○ | 14 | 4 |
| 02 | ××○○○ | 14 | 4 |
| 02 | ○××○× | 14 | 3 |
| 03 | ○×××○ | 13 | 5 |
| ... | ... | ... | ... |
| 24 | ○○○×○ | 5 | 2 |
| 25 | ○○○○× | 4 | 1 |
| 26 | ○×××× | 3 | 1 |
| ... | ... | ... | ... |

FIG. 20

| EVENT PLACE | ADDRESS | LATITUDE | LONGITUDE | 1ST CLOSEST STATION | TIME FROM 1ST CLOSEST STATION | 2ND CLOSEST STATION | TIME FROM 2ND CLOSEST STATION |
|---|---|---|---|---|---|---|---|
| OIMACHI | SHINAGAWA TOKYO | N35.36.16 | E139.44.03 | JR LINE OIMACHI | 5 MIN. | TOKYU LINE OIMACHI | 4 MIN. |

FIG. 25

| STATION | ADDRESS | NAME OF RAILROAD ROUTE | LATITUDE | LONGITUDE | TIME FROM CLOSEST STATION OF EVENT PLACE |
|---|---|---|---|---|---|
| OIMACHI | SHINAGAWA, TOKYO | JR | N35.36.20 | E139.44.10 | — |
| KAMATA | OTA, TOKYO | JR | N35.33.20 | E139.42.60 | 11 MINUTES |
| TOKYO | CHIYODA, TOKYO | JR | N35.40.55 | E139.46.15 | 15 MINUTES |
| ⋮ | ⋮ | ⋮ | ⋮ | ⋮ | ⋮ |

FIG. 26

| MEMBER NO. | NAME OF MEMBER | LATITUDE | LONGITUDE | CLOSEST STATION | PRESENT TIME |
|---|---|---|---|---|---|
| 001 | NORIKO MURAKAMI | N35.40.50 | E139.46.08 | TOKYO | 12:03 |
| 111 | TARO YAMADA | N35.37.13 | E139.45.09 | TENNOUZU ISLE | 12:00 |
| 123 | AKIKO SATO | N35.39.01 | E140.02.28 | KAIHIN-MAKUHARI | 12:05 |
| 200 | NOBUO KANDA | N35.33.17 | E139.42.57 | KAMATA | 12:04 |
| 077 | TAKESHI YAMAKAWA | N35.34.50 | E139.38.34 | MUSASHI-NAKAHARA | 12:06 |

FIG. 27

EVENT INVITATION METHOD AND SYSTEM

TECHNICAL FIELD OF THE INVENTION

The present invention relates to an information processing technique for sending invitations to an event such as a concert.

BACKGROUND OF THE INVENTION

According to the conventional art, usually a person who bought a ticket of an event or the like cannot have a ticket price refunded by the promoter of the event even when he cannot attend the event for a certain reason after buying the ticket. The only measures he can take in such a situation are to sell the ticket to others or consign the ticket to a discount ticket store. However, if something that will prevent him from attending the event happens immediately before the start of the event, he cannot even sell the ticket to others. On the other hand, there are events for which many customers cannot buy tickets.

There may also occur a case that a promoter of a public performance wants to sell seats that have become vacant several days before the performance. For example, even in a public performance for which tickets have been sold out, there may occur a case that seats that were secured for adjustments become available immediately before the performance. However, in this case, it is not appropriate to put an advertisement for a small number of tickets; there is no available method for selling those seats.

The above problems were mainly caused by the fact that, in the conventional art, it was impossible to issue invitations to an event such as a concert in timely fashion in accordance with situations of customers or the like. That is, a promoter did not have sufficient time, money, and human resources to enable resale of canceled tickets, and customers could not know status of available seats or the like immediately before events.

SUMMARY OF THE INVENTION

An object of the present invention is therefore to provide a technique that makes it possible to send invitations to an event efficiently to customers who will attend the event at high probabilities.

An event invitation method according to the invention comprises the step of: acquiring position information of a customer who is registered in advance; judging whether or not information of an invitation to an event is to be sent to a terminal of the customer based on at least a positional relationship between the customer and a site of the event; and sending the information of the invitation to the event to the customer to whom it is judged that the information of the invitation to the event should be sent.

With this method, for example, by sending event invitation information to customers who are registered in advance and will attend the event at high probabilities and who exist near the event site or customers who can reach the event site within a prescribed time, collection of customers who attend the event and resale of canceled tickets can be performed efficiently.

The above judging step may comprise a step of judging whether the customer exists in such an area as to be able to attend the event based on the positional relationship between the customer and the event site and time of the event. For example, by sending event invitation information to only customers who can reach the event site by the event start time or end time, collection of customers who attend the event and resale of canceled tickets can be performed efficiently.

The above acquiring step, judging step, and sending step may be executed in accordance with a time from the present time to the event start time or end time. In this case, the geographical area for sending event invitation information gradually narrows as the time to the event start time or end time becomes shorter. This makes it possible to send invitations to an event in timely fashion, for example, according to available seats that vary with time.

The event invitation method may further comprise the steps of: receiving from a terminal of a customer, an attendance request for a plurality of persons, wherein the attendance request includes destination information of ticket information; judging whether tickets can be assigned to the plurality of persons of the attendance request; and if it is judged at least that the tickets can be assigned to the plurality of persons (for example, whether they can pay for the tickets may also be checked), sending the ticket information to respective terminals of the plurality of persons according to the destination information. Scalper-like activities can be prevented by a configuration in which the ticket information is sent to an intended terminal and cannot be sent to other terminals or a configuration in which the ticket information cannot be used in other terminals.

The event invitation method according to the invention can be implemented by a combination of a program and a computer. In this case, the program is stored in a storage medium or device such as a floppy disk, a CD-ROM, a magneto-optical disk, a semiconductor memory, or a hard disk drive. The program may be sent over a network. Data that occurs during processing are temporarily stored in a memory of the computer.

BRIEF DESCRIPTION OF THE DRAWINGS

FIG. 4 shows an exemplary screen for registration of ticket cancellation;

FIG. 5 shows exemplary canceled ticket information;

FIG. 6 shows an exemplary screen for waiting list registration;

FIG. 7 shows exemplary waiting list information;

FIG. 10 shows an exemplary screen for purchase intention registration;

FIG. 11 shows an exemplary mail for notifying assignment of canceled tickets;

FIG. 16 shows exemplary information that is stored in a station position database;

FIG. 17 shows an exemplary initial setting of a notification area;

FIG. 18 shows an exemplary setting as to timing to start the process of FIG. 14;

FIG. 19 shows an exemplary setting of a walk-accessible area;

FIG. 20 shows exemplary information that is stored in a registration status database;

FIG. 21 shows exemplary information that is stored in a waiting member position database;

FIG. 25 shows exemplary information that is stored in the event place position database in the specific example of FIG. 24;

FIG. 26 shows exemplary information that is stored in the station position database in the specific example of FIG. 24; and FIG. 27 shows exemplary information that is stored in the waiting member position database in the specific example of FIG. 24.

DETAIL DESCRIPTION OF THE PREFERRED EMBODIMENTS

Figure 1:
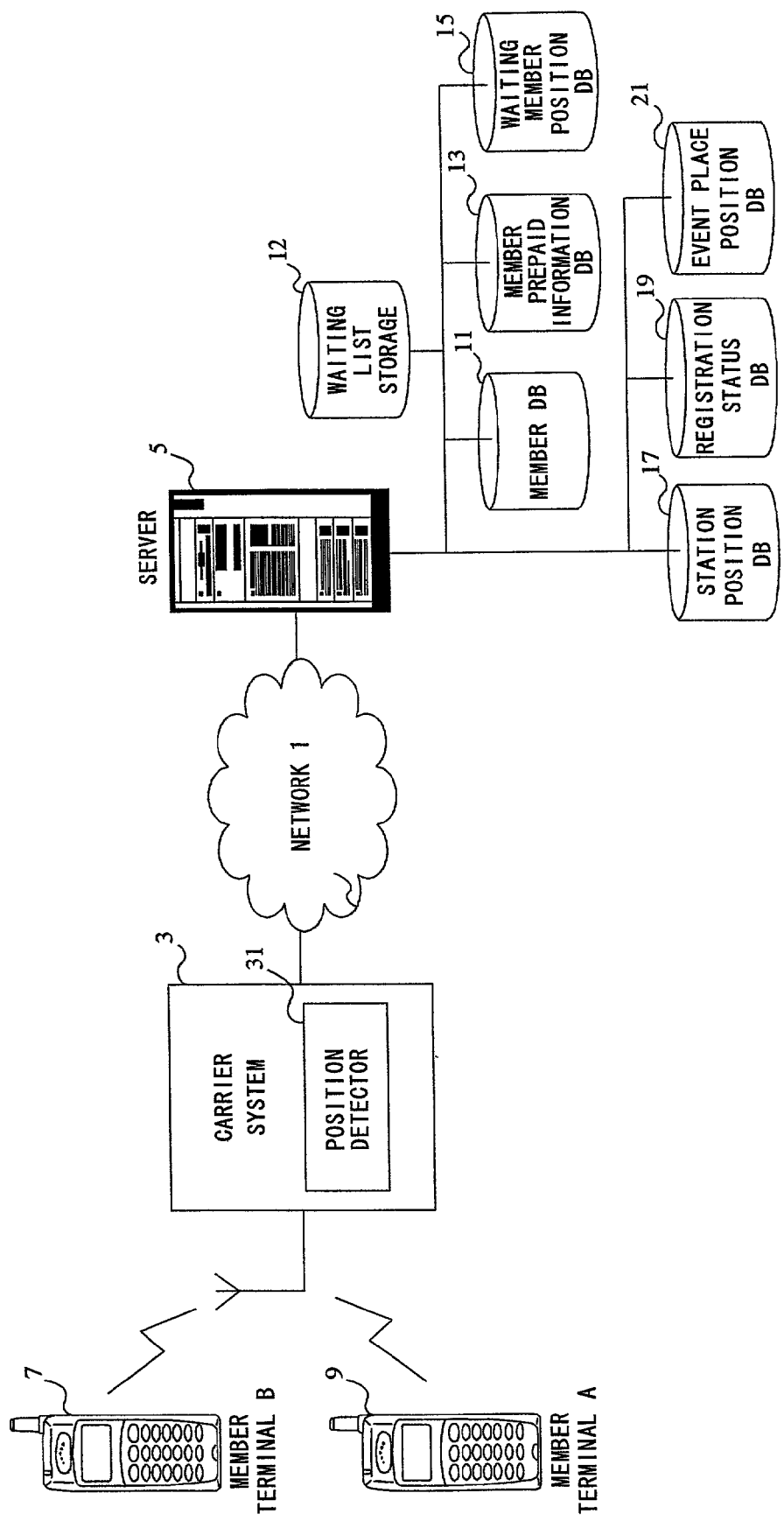
FIG. 1 is a diagram showing a system outline according to an embodiment of the present invention.

FIG. 1 shows a system outline according to an embodiment of the present invention. Member A has a member terminal A (9) that is a cellular phone, for example. Similarly, member B has a member terminal B (7). The member terminals A (9) and B (7) communicate with radio base stations of a carrier system 3 by radio. At this time, if three radio base stations, for example, receive radio waves from one member terminal, it is recognized that the member terminal exists in a triangle that is formed by the three radio base stations and an approximate latitude and longitude of the member terminal can be calculated based on the strengths of the radio waves and other information. The carrier system 3 is provided with a position detector 31 that performs such processing. Although only two member terminals are shown in FIG. 1, the number of member terminals is arbitrary. Each member terminal is not limited to a cellular phone and may be a PHS (personal handy phone system) phone or a portable terminal such as a PDA (personal digital assistant) that is connected to a cellular phone, a PHS phone, or a portable terminal, which has a communication function.

The carrier system 3 is connected to a network 1 such as the Internet and the position detector 31 can provide, over the network 1, calculated position information of a member terminal. Many servers are connected to the network 1, and a server 5 having main functions according to the embodiment is also connected to the network 1.

For example, the server 5 is a server that provides a home page of a fan club of a particular musician. That is, the server 5 has a Web server function. In this embodiment, it is assumed that a money pooling system is employed as a settlement means because there may occur a case that the server 5 provides a membership fan club that sells goods, distributes pay musical data, sells tickets, or does a similar activity. Although a configuration is possible in which that enables use of such a settlement method as bank account depositing, bank account transfer, credit card settlement, or cash on delivery is needed, to simplify the description it is assumed in this embodiment that a money pooling system is employed.

In this embodiment, a ticket that is issued by the server 5 is an electronic ticket and is sent from the server 5 to a member terminal and held there. Whether the electronic ticket is a legitimate one is checked by a predetermined method at the entrance of the place of a concert, and entrance is permitted if it is confirmed that the ticket is a legitimate one. Various methods can be used for this purpose. One method is as follows. Information on a member terminal or a member and ticket information are encrypted by using a prescribed key and sent to the member terminal and stored there in advance. At the entrance of the place of a concert or the like, the ticket information and the information on the member terminal or the member stored in the member terminal is sent from the member terminal to a terminal for collation that is provided at the entrance, by using such a technique as Bluetooth, which is a standard of short-distance radio communication; for details, refer to http://www.bluetooth.com. The terminal for collation decrypts the received ticket information and information on the member terminal or the member and collates it with the information that was generated when the ticket was issued and is stored in the server 5. Entrance is permitted if it is confirmed by the collation that the ticket is a legitimate one.

The server 5 manages a member database 11 for storing personal information of members, a waiting list storage 12 for storing a waiting list of members, a member prepaid information database 13 for storing such information as a remaining amount of pooling money and a purchase history of each member, a waiting member position database 15 for storing current position information, received from the position detector 31 of the carrier system 3, of members who are registered on a waiting list, a station position database 17 for storing position information of stations near the site of a concert, a registration status database 19 for storing a purchase status of tickets of a concert or the like, and an event place position database 21 for storing position information of the site of a concert.

Figure 2:
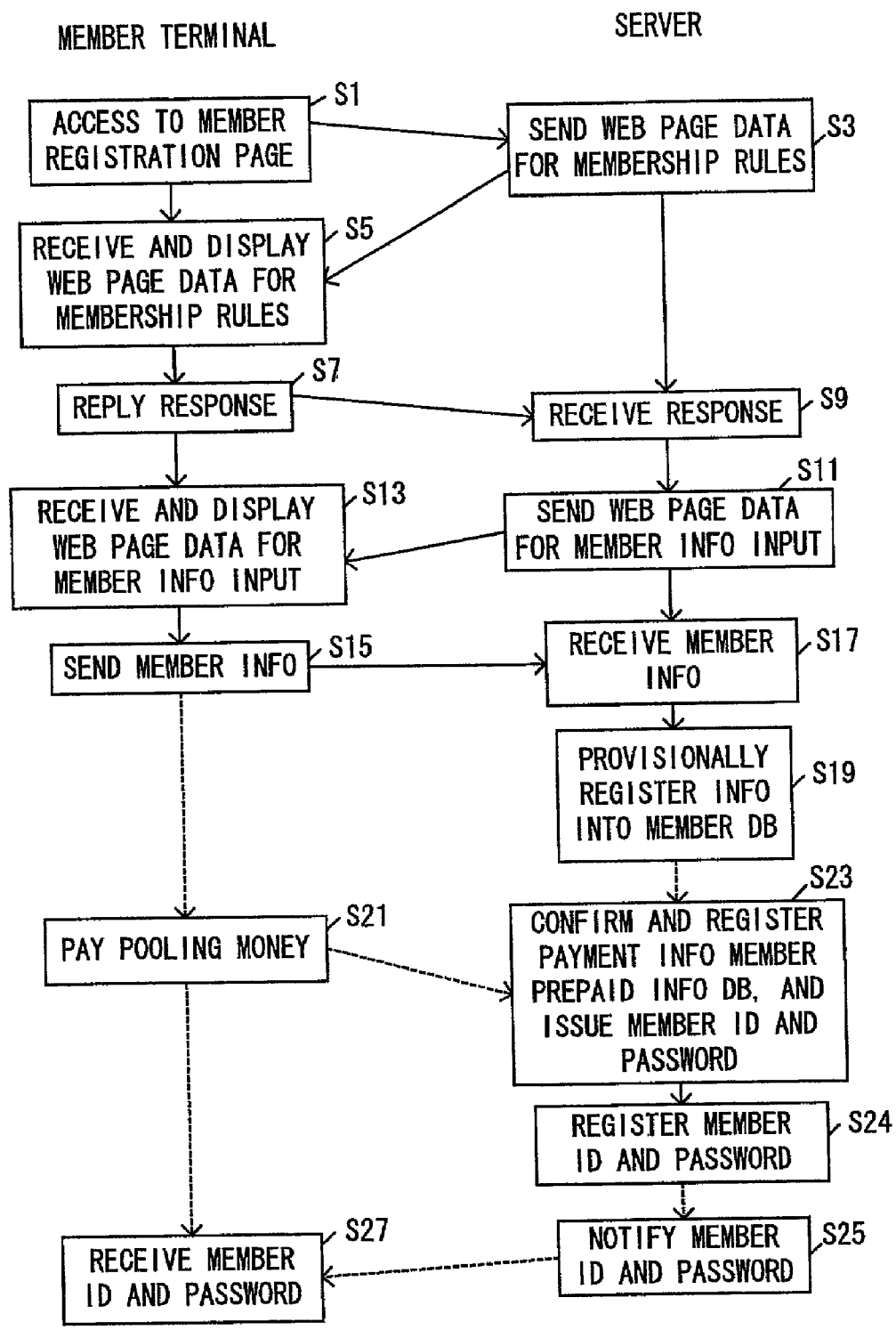
FIG. 2 is a flowchart showing a process of member registration.

Next, processing flows of the system shown in FIG. 1 will be described. First, a processing flow of member registration will be described with reference to FIG. 2. A user who wants to become a member accesses a member registration page of the server 5 by manipulating the member terminal A (9) (step S1). In the processing flow of FIG. 2, the member terminal A (9) may be a computer such as a personal computer rather than the cellular phone. In response to this access, the server 5 sends web page data for presenting membership rules including the contents of membership rules to the member terminal A (9) (step S3). The web page data is, for example, an HTML (Hyper text markup language) file, compact HTML file, or an XHTML file and image files if it is embedded. The member terminal A (9) receives the web page data for presenting the membership rules from the server 5, and displays it on a display device (step S5). The user checks the contents of the membership rules. The user depresses an OK button displayed on the screen if he agrees with the rules, and depresses a cancel button if he does not agree with the rules.

In response to this operation, the member terminal A (9) replies, to the server 5, a response according to the user's instruction, that is, the OK or cancellation instruction (step S7). The server 5 receives the response from the member terminal A (9) (step S9), and checks its contents. If the response represents a cancellation instruction, the server 5 finishes this processing. On the other hand, if the response represents an OK instruction, the server 5 sends web page data for inputting member information to the member terminal A (9) (step S11). The member terminal A (9) receives the web page data for inputting member information, and displays it on the display device (step S13). Information that should be registered as member information is a name, a gender, a date of birth, an address, a telephone number, a cellular phone number, an e-mail address, etc.

The user inputs such information to the screen for inputting member information and instructs the member terminal A (9) to send it out. Then, the member terminal A (9) sends the input member information to the server 5 (step S15). The server 5 receives the member information from the member terminal A (9) (step S17), and registers it in the member database 11 provisionally (step S19). In this embodiment, provisional registration is performed at this stage. For example, although not shown in FIG. 2, manner-of-payment information (e.g., information of a bank account in which money should be deposited) may be sent through a Web page or by e-mail. A temporary member number or the like may be issued to easily confirm payment.

The user pays pooling money according to the manner-of-payment information, for example (step S21). Step S21 is drawn as a broken-line block in FIG. 2 because it is not executed by the member terminal A (9). Not only pooling money is paid, but also an entrance fee etc. may be paid together with the pooling money. The server 5 confirms the payment based on information that is received from a financial institution, and registers such information as a paid amount of money and a date in the member prepaid information database 13. Further, the server 5 issues a member ID and a password (step S23). The server 5 registers the issued member ID and password in the member database 11 (step S24). The formal registration completes here. The member ID and the password are notified to the user by mail or e-mail or by some other method (Step S25). Step S25 is drawn as broken-line block in FIG. 2 because it may not be executed by the server 5. The user receives the member ID and the password (step S27). Step 27 is also drawn as a broken-line block in FIG. 2 because it may not be executed by the user terminal A (9). In this manner, the member registration process including first payment of pooling money is completed.

Figure 3:
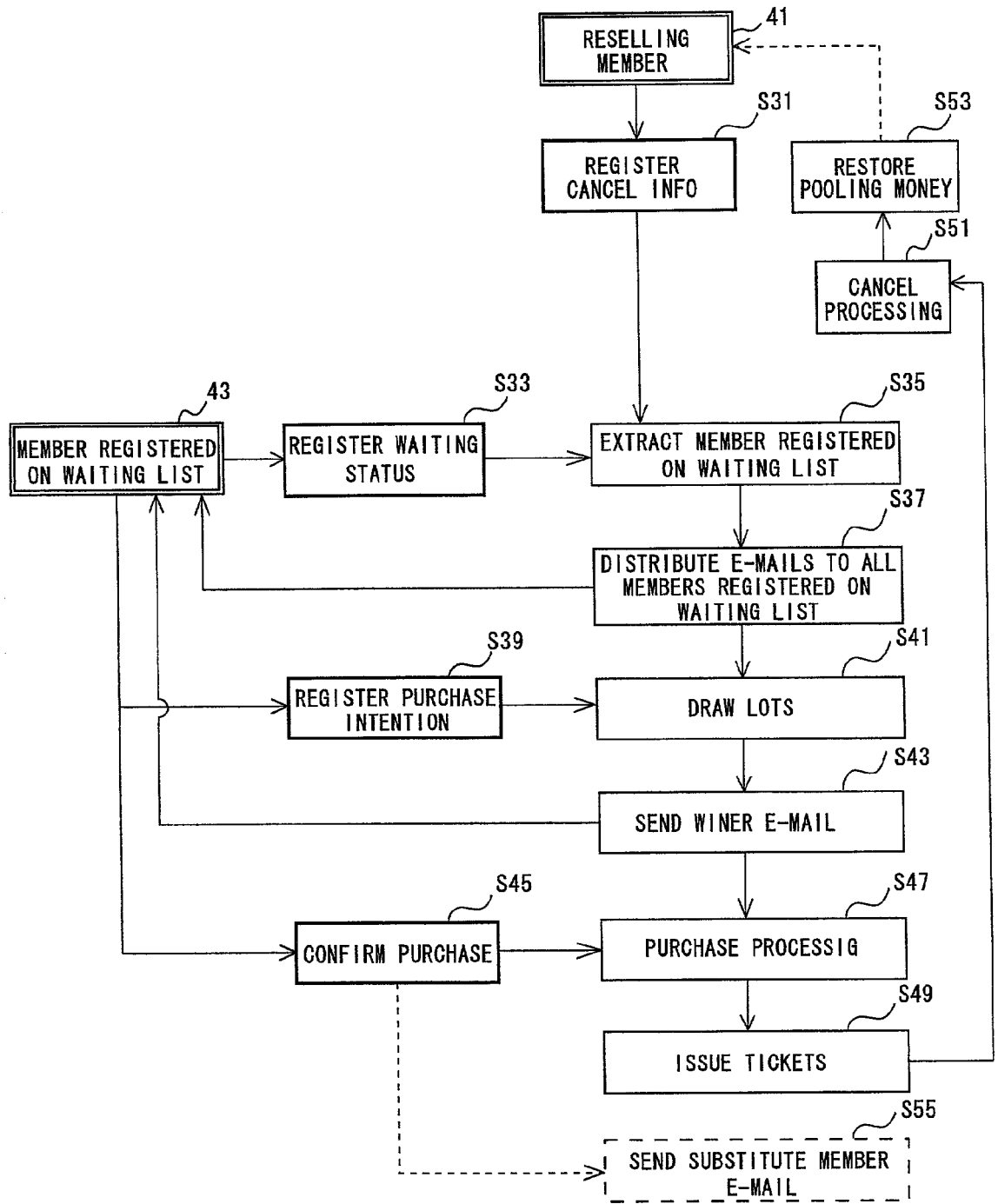
FIG. 3 is a flowchart showing a process that is executed in reselling canceled tickets until the day preceding the day of an event.

Next, a processing flow in a following situation is explained. That is, a person (member) 41 who wants to resell his ticket cancels the ticket and a member 43 registered on a waiting list buys the canceled ticket. FIG. 3 shows a processing flow to the day preceding the day of a concert or the like. The person 41 who wants to resell his ticket causes the server 5 to register cancellation information of the electronic ticket held by himself using the member terminal A (9), for example, in the following manner (step S31) After the person 41 logs in using his member ID and password, web page data is sent from the server 5 to the member terminal A (9) and the member terminal A (9) receives and displays it on a display device as shown in FIG. 4. In this embodiment, the person 41 is requested to input a purchase number that was issued at the time of the purchase of tickets concerned and the number of tickets to be canceled (i.e., the number of tickets that he wants to resell). The person 41 inputs the purchase number and the number of tickets to be canceled to the member terminal A (9) and has it send them to the server 5. The server 5 receives the purchase number and the number of tickets to be cancelled, and extracts canceled ticket information corresponding to the received purchase number from the member database 11.

FIG. 5 shows an example of extracted canceled ticket information. In this example of FIG. 5, the canceled ticket information includes a purchase number, a registration number of a public performance, a title of the public performance, a date of the public performance, a member telephone number, a member name, a member number, a member e-mail address, a purchased seat type-1 (S, A, or B; it is assumed that there may be plural types of seats), the first number of purchased tickets corresponding to the purchased seat type-1, a purchased seat type-2, and the second number of purchased tickets corresponding to the purchased seat type-2. If there is only one type of purchased seats, the canceled ticket information does not include the purchased seat type-2 and the following items. If there are three or more types of purchased seats, information is added after the purchased seat type-2.

On the other hand, a member 43 who wants to have himself registered on a waiting list registers himself using the member terminal B (7), for example, in the following manner (step S33). After the member 43 logs in using his member ID and password, web page data is sent from the server 5 to the member terminal B (7) and the member terminal B (7) receives and displays it on a display device as shown in FIG. 6. In this example of FIG. 6, the member 43 registered on a waiting list is requested to input a registration number of a public performance, which identifies a concert or the like, a desired seat type (e.g., S, A, or an arbitrary seat type), and the number of tickets he wants to buy. The member 43 inputs a registration number of a public performance, a desired seat type, and the number of tickets that he wants to buy to the member terminal B (7) and has it send them to the server 5. The server 5 receives the registration member of the performance, the desired seat type, and the number of tickets, and extracts information on the member 43 from the member database 11. Further, the server 5 generates waiting list information based on the received registration number of the public performance, desired seat type, and number of tickets he wants to buy, and stores the generated waiting list information into the waiting list storage 12.

FIG. 7 shows exemplary waiting list information. In this example of FIG. 7, the waiting list information includes the registration number of the public performance, which was received from the member terminal B (7) of the member 43, a public performance name corresponding to the registration number of the public performance, a date of the public performance, and a member telephone number, a member name, a member number, and a member e-mail address that are extracted from the member database 11, as well as the desired seat type (e.g., S, A, or an arbitrary seat type), and the number of tickets he wants to buy, which were received from the member terminal B (7). There may occur a case that plural types of seats are designated.

Then, at a proper time point, the server 5 extracts members 43 who are registered on the waiting list of a certain public performance (step S35). For example, if waiting list information registered at step S33 are stored in the waiting list storage 12, the server 5 searches for all of the members 43 using the registration number of the public performance or the like. The server 5 sends mails for announcing resale of canceled tickets to all the extracted members 43 who are registered on the waiting list (step S37). The members 43 receive the mail for announcing resale of canceled tickets using their member terminals B (7). Some of the members 43 who want to buy the canceled tickets actually perform purchase intention registration by manipulating their member terminals B (7) in the following manner (step S39). After each member 43 who wants to buy the canceled tickets logs in using his member ID and password, his member terminal B (7) receives web page data for registering purchase intention from the server 5 and displays it on a display device. For example, the screen for registering purchase intention includes indications of a public performance name, a public performance date, and a place where the public performance will be given, check boxes to confirm the intention of purchase, a indication of a desired seat type, check boxes indicate whether or not a change is allowable when the number of remaining seats is small, an indication of a desired number of tickets, and an input column to input a minimum desired number of tickets. Each member 43 who wants to buy the canceled tickets checks the display contents and sends, to the server 5, an indication that confirms his intention of purchase, an indication of whether or not a change is allowable when the number of remaining tickets is small, a minimum desired number of tickets, and other information. The server 5 receives and stores this information.

Then, at a proper time point, the server 5 draws lots to determine, as a winner(s), one (or more) of the members who registered the purchase intention (step S41) Since the drawing is done on or before the day preceding the day of the concert or the like, there does not occur a problem that the winner of the drawing cannot get, in time for the opening time of the concert, even if the tickets are distributed after the drawing. The server 5 sends the winner an e-mail for announcing his win of the drawing (step S43). The winner receives the mail for announcing his win of the drawing by manipulating his member terminal B (7), and finally confirms his intention of purchase by accessing the server 5 again (step S45). At this stage, the server 5 performs purchase processing that includes settlement processing such as having a ticket price paid from the pooling money of the winner by referring to the member prepaid information database 13 (step S47). The server 5 issues electronic tickets to the specified member terminal B (7) (step S49). The system may be configured in such a manner that electronic tickets can be sent to a plurality of member terminals if a plurality of tickets are purchased.

After the ticket issuance processing, the server 5 performs cancellation processing for the person 41 who requested the resale of tickets (step S51). This cancellation processing invalidates the electronic tickets that are stored in the member terminal A (9) of the person 41. After this processing, the server 5 performs processing of restoring pooling money of the person 41 corresponding to the ticket price (step S53). In this embodiment, as described above, the person 41 is not refunded the pooling money unless the canceled tickets are bought by another person.

There may occur a case that even the winner of the drawing at step S41 no longer needs the tickets when receiving the e-mail for announcing his win. In this case, purchase intention is not confirmed at step S45 or cancellation registration is performed at this stage. Drawing may be performed again after a lapse of a prescribed time, or an e-mail for announcing a win may be sent to a substitute winner who was predetermined by the drawing at step S41 (step S55).

With the above processing, a person 41 who wants to resell his tickets because he can no longer attend an event such as a concert for some reason can easily request cancellation of the tickets and the probability that members registered on a waiting list can attend the event such as a concert is increased. Further, the use of the system according to the embodiment enables efficient and fair redistribution of tickets.

Figure 8:
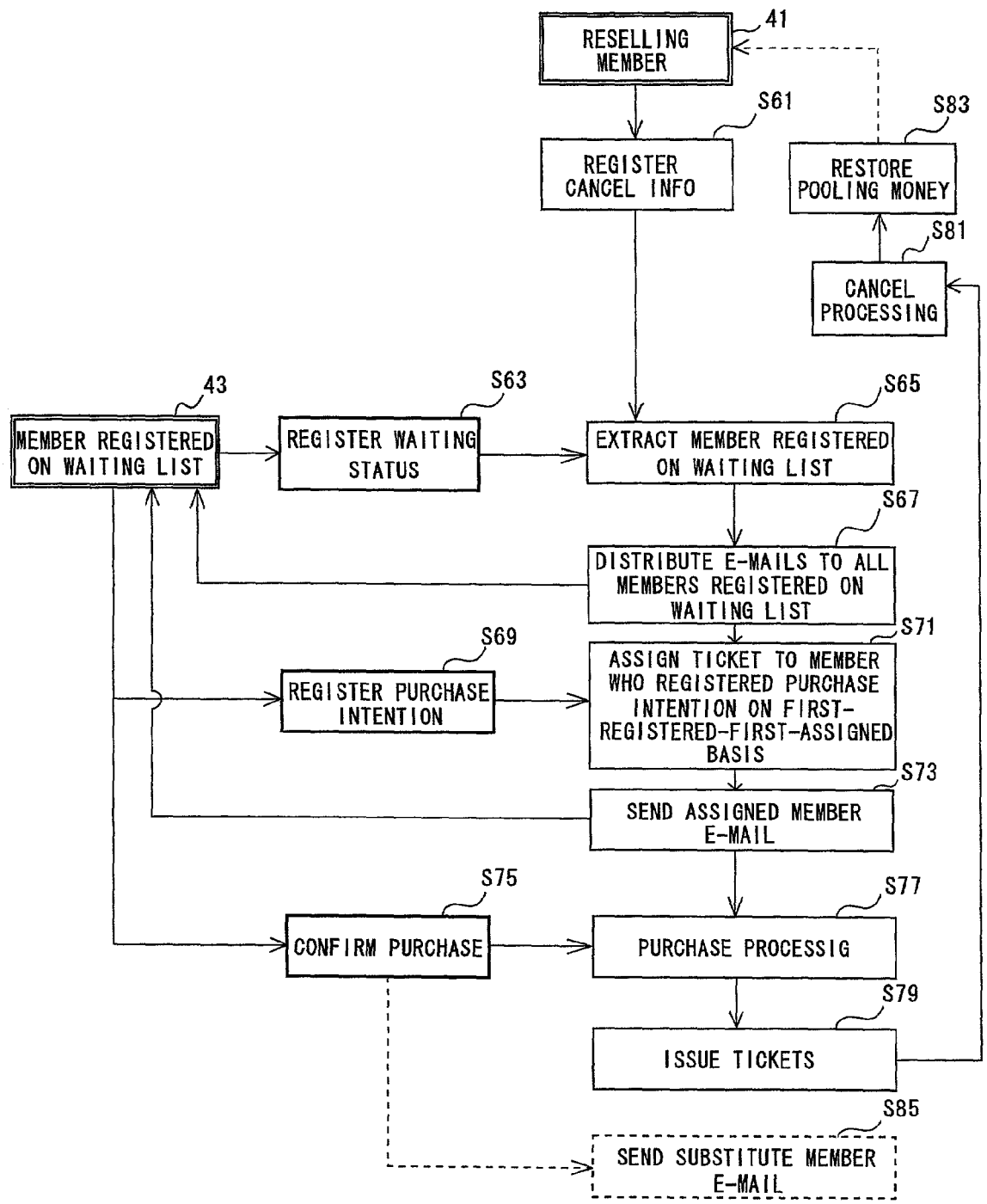
FIG. 8 is a flowchart showing a process that is executed in reselling canceled tickets until a prescribed number of hours before the opening time of an event.

Next, a processing flow until a time point about six hours, for example, before the opening time of a concert or the like, will be described with reference to FIG. 8. A person 41 who wants to resell his tickets causes the server 5 to register cancellation information of the electronic tickets held by himself using the member terminal A (9), for example, in the following manner (step S61). After the person 41 logs in using his member ID and password, web page data for the resale is sent from the server 5 to the member terminal A (9) and the member terminal A (9) receives and displays it on a display device as shown in FIG. 4. In this embodiment, the person 41 is requested to input a purchase number that was issued at the time of the purchase of tickets concerned and the number of tickets to be canceled (i.e., the number of tickets that he wants to resell). The person 41 inputs the purchase number and the number of tickets to be canceled to the member terminal A (9) and has it send them to the server 5. The server 5 receives the purchase number and the number of tickets and extracts canceled ticket information corresponding to the received purchase number from the member database 11. FIG. 5 shows similarly an example of extracted canceled ticket information.

On the other hand, a member 43 who wants to have himself registered on a waiting list does so using the member terminal B (7), for example, in the following manner (step S63). After the member 43 logs in using his member ID and password, web page data for registering himself for waiting is sent from the server 5 to the member terminal B (7) and the member terminal B (7) receives and displays it on a display device as shown in FIG. 6. In this embodiment, the member 43 is requested to input a registration number of a public performance, which identifies a concert or the like, a desired seat type (e.g., S, A, or an arbitrary seat type), and the number of tickets he wants to buy. The member 43 inputs the registration number of the public performance, the desired seat type, and the number of tickets that he wants to buy, into the member terminal B (7) and has it send them to the server 5. The server 5 receives the registration number of the public performance, the desired seat type and the number of tickets, and extracts information on the member 43 from the member database 11. Further, the server 5 generates waiting list information based on the received registration number of the public performance, desired seat type, and number of tickets he wants to buy, which are received from the member terminal B (7), and information extracted from the member database 11, and stores the generated waiting list information into the waiting list storage 12. The waiting list information is the same as one shown in FIG. 7. It is sufficient for the member 43 to be registered on the waiting list in advance; he may be registered on the waiting list before the day of the concert or the like not on the day of the concert.

Then, at an appropriate time point, the server 5 extracts members 43 who are registered on the waiting list of a certain public performance (step S65). For example, if the waiting list information registered at step S63 are stored in the waiting list storage 12, the server 5 searches for the members 43 using the registration number of the public performance or the like. The server 5 sends an e-mail for announcing resale of canceled tickets to all the extracted members 43 who are registered on the waiting list (step S67). The members 43 receive the mail for announcing resale of canceled tickets using their member terminals B (7). Some of the members 43 who want to buy the canceled tickets actually perform purchase intention registration by manipulating their member terminals B (7) in the following manner (step S69). After each member 43 who wants to buy the canceled tickets logs in using his member ID and password, his member terminal B (7) receives web page data for registering the purchase intention from the server 5 and displays it on a display device. For example, the screen for the purchase intention registration includes indications of a public performance name, a public performance date, and a place where the public performance will be given, check boxes to confirm the intention of purchase, an indication of a desired seat type, check boxes to indicate whether or not a change is allowable when the number of remaining seats is small, an indication of a desired number of tickets, and an input column to input a minimum desired number of tickets. Each member 43 who wants to buy the canceled tickets checks the display contents and sends, to the server 5, an indication that confirms his intention of purchase, an indication of whether or not a change is allowable when the number of remaining tickets is small, a minimum desired number of tickets, and other information. The server 5 receives and stores this information.

Once purchase intention is registered by members 43 on the waiting list, the server 5 determines, on a first-registered-first-assigned basis, one (or more) of them to whom the canceled tickets should be assigned (step S71). This is because if the canceled tickets were not assigned on a first-registered-first-assigned basis, a problem would arise that the promoter ends up having tickets that remain unsold whereas members cannot fix their schedules. Then, the server 5 sends the member 43 to whom the ticket is assigned (hereinafter called ticket-assigned member) an e-mail for announcing that the canceled tickets have been assigned to him (step S73). The ticket-assigned member 43 receives the mail by manipulating his member terminal B (7), and finally confirms his intention of purchase by accessing the server 5 again (step S75). At this stage, the server 5 performs purchase processing that includes settlement processing such as having a ticket price paid from the pooling money of the ticket-assigned member 43 by referring to the member prepaid information database 13 (step S77). The server 5 issues electronic tickets to the specified member terminal B (7) (step S79). The system may be configured in such a manner that electronic tickets can be sent to a plurality of member terminals if the ticket-assigned member 43 purchased a plurality of tickets.

After the ticket issuance processing, the server 5 performs cancellation processing for the person 41 who requested the resale of tickets (step S81). This cancellation processing invalidates the electronic tickets that are stored in the member terminal A (9) of the person 41. After this processing, the server 5 performs processing of restoring pooling money of the person 41 corresponding to the ticket price (step S83). In this embodiment, as described above, the person 41 is not refunded the pooling money unless the canceled tickets are bought by another person.

There may occur a case that even the member 43 who was assigned the canceled tickets at step S71 no longer needs the tickets when receiving the e-mail for announcing that he has been assigned the canceled tickets. In this case, purchase intention is not confirmed at step S75 or assignment cancellation registration is performed at this stage. The tickets concerned may be subjected again to the assigning processing at step S71, or an e-mail for announcing the assignment of the canceled tickets may be sent to a substitute member who was not assigned the canceled tickets at step S71 (step S85).

With the above process, a person 41 who wants to resell his tickets because he can no longer attend an event such as a concert for some reason can easily request cancellation of the tickets and the probability that members on a waiting list can attend the event is increased. Further, the use of the system according to the embodiment enables efficient redistribution of tickets.

Next, a processing flow from a time point, for example, six hours before the opening time of a concert or the like, will be described with reference to FIG. 9. A person 41 who wants to resell his tickets causes the server 5 to register cancellation information of the electronic tickets held by himself using the member terminal A (9), for example, in the following manner (step S91). After the person 41 logs in using his member ID and password, web page data for the resale is sent from the server 5 to the member terminal A (9) and the member terminal A (9) receives and displays it on a display device as shown in FIG. 4. In this embodiment, the person 41 is requested to input a purchase number that was issued at the time of the purchase of tickets concerned and the number of tickets to be canceled (i.e., the number of tickets that he wants to resell). The person 41 inputs the purchase number and the number of tickets to be canceled to the member terminal A (9) and has it send it to the server 5. The server 5 receives the purchase number and the number of tickets, and extracts canceled ticket information corresponding to the received purchase number from the member database 11. An example of extracted canceled ticket information is the same as one shown in FIG. 5.

On the other hand, a member 43 who wants to have himself registered on a waiting list does so using the member terminal B (7), for example, in the following manner (step S93). After the member 43 logs in using his member ID and password, web page data for registering himself for waiting is sent from the server 5 to the member terminal B (7) and the member terminal B (7) receives and displays it on a display device as shown in FIG. 6. In this embodiment, the member 43 is requested to input a registration number of a public performance, which identifies a concert or the like, a desired seat type (e.g., S, A, or an arbitrary seat type), and the number of tickets he wants to buy. The member 43 inputs a registration number of a public performance, a desired seat type, and the number of tickets that he wants to buy to the member terminal B (7) and has it send them to the server 5. The server 5 receives the registration number of the public performance, the desired seat type and the number of tickets, and extracts information on the member 43 from the member database 11. Further, the server 5 generates waiting list information based on the received registration number of the public performance, desired seat type, and number of tickets he wants to buy, which are received from the member terminal 7 (B), and the information extracted from the member database 11, and stores the generated waiting list information into the waiting list storage 12. Waiting list information is the same as on shown in FIG. 7. It is sufficient for the member 43 to be registered on the waiting list in advance; he does not have to be registered on the waiting list six hours before the opening time of the concert.

The server 5 specifies an extraction region based on the opening time of the concert or the like (step S95). Then, the server 5 specifies members 43 on the waiting list who exists within the extraction region by referring to the waiting member position database 15 (step S97) and sends an e-mail for announcing resale of canceled tickets to the members 43 who exists within the extraction region (step S99). The extraction region etc. will be described later in detail. The members 43 receive the e-mail for announcing resale of canceled tickets using their member terminals B (7). If a member 43 wants to buy the canceled tickets when reading the e-mail, he registers purchase intention by manipulating his member terminal B (7) in the following manner (step S101). After the member 43 who wants to buy the canceled tickets logs in using his member ID and password, his member terminal B (7) receives web page data for registering purchase intention from the server 5 and displays it on a display device.

FIG. 10 shows an exemplary screen for registering purchase intention. In the example of FIG. 10, the screen for registering purchase intention includes indications of a public performance name, a public performance date, and a place where the public performance will be given, check boxes to confirm the intention of purchase ("yes" and "no" of item 1 "purchase confirmation"), an indication of a desired seat type (item 2 "desired seat type" (i.e., a seat type that was specified at the time of registration on the waiting list)), check boxes to indicate whether or not a change is allowable when the number of remaining seats is small ("yes" and "no" of item 3 "allowability of change of seat type"), a desired number of tickets (item 4 "desired number of tickets" (i.e., the number of tickets that was specified at the time of registration on the waiting list)), an input column for inputting a minimum desired number of tickets (item 5 "minimum desired number of tickets"), an indication of an optimum route that allows the customer to reach the place of the concert or the like efficiently (a specific route, "roughly estimated time taken", and "fare" of item 6 "optimum route"), and an indication column to indicate whether it is necessary to send tickets to a person other than the member 43 concerned in the case where the member 43 concerned plans to go to the concert or the like with other persons ("number of tickets" and "e-mail address for ticket destination" of item 7 "separate sending of tickets"). After inputting information for the items that require input, the member 43 depresses a "send" button that is located at the bottom of the screen of FIG. 10, whereby the input information is sent from the member terminal of the member 43 to the server 5 and registered there. As shown in FIG. 10, an optimum route from a station closest to the current position of a member 43 concerned to a station closest to the place of the concert or the like and its fare are calculated by the server 5 and presented to the member 43. Alternatively, such information is calculated and stored in the station position database 17 in advance and read out from the station position database 17 and output when information as shown in FIG. 10 is output.

Figures 12, 15:
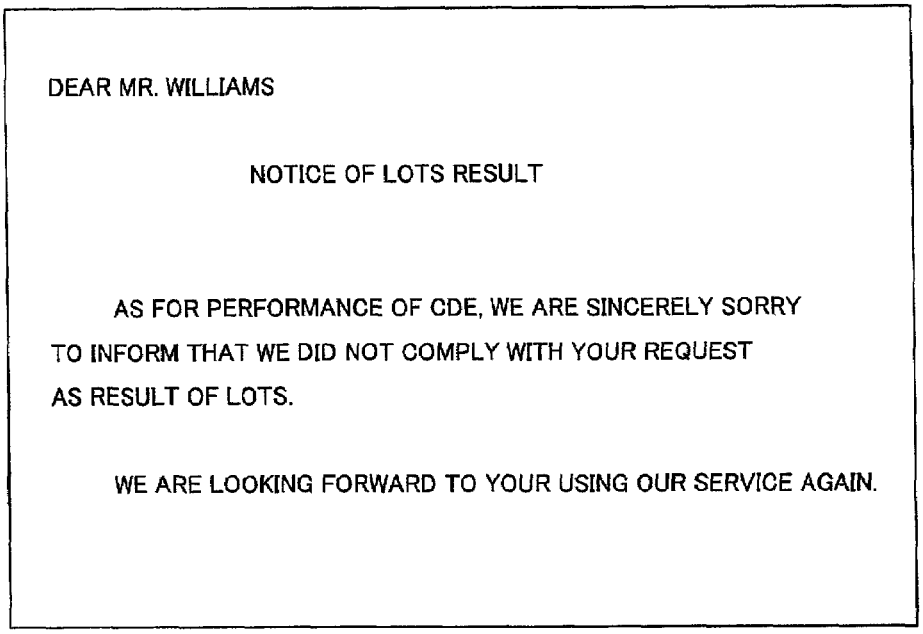
FIG. 12 shows an exemplary mail for notifying that canceled tickets have not been assigned.
FIG. 15 shows exemplary information that is stored in an event place database.

Once purchase intention is registered by members 43 on the waiting list, the server 5 determines, on a first-registered-first-assigned basis, one (or more) of them to whom the canceled tickets should be assigned (step S103). This is because if the canceled tickets were not assigned on a first-registered-first-assigned basis, a problem would arise that the promoter ends up having tickets that remain unsold whereas members cannot fix their schedules. Then, the server 5 sends the member 43 to whom the ticket is assigned, an e-mail for announcing that the canceled tickets have been assigned to him (step S105). For example, an e-mail as shown in FIG. 11 for announcing the assignment of the canceled tickets is sent, which includes a public performance name, a date, a place, the number of tickets, an explanation of a ticket issuance procedure, and an explanation of charge settlement. On the other hand, an e-mail shown in FIG. 12, for example, may be sent to members 43 on the waiting list who were not assigned the canceled tickets. It is noted that the e-mail of FIG. 12 states that drawing was done. The ticket-assigned member 43 receives the e-mail for announcing the assignment of the canceled tickets by manipulating his member terminal B (7), and finally confirms his intention of purchase by accessing the server 5 again (step S107). At this stage, the server 5 performs purchase processing that includes settlement processing such as having a ticket price paid from the pooling money of the ticket-assigned member 43 by referring to the member prepaid information database 13 (step S109) The server 5 issues electronic tickets to the specified member terminal B (7) (step S111). The system may be configured in such a manner that electronic tickets can be sent to a plurality of member terminals if the ticket-assigned member 43 purchases a plurality of tickets.

After the ticket issuance processing, the server 5 performs cancellation processing for the person 41 who requested the resale of tickets (step S113). This cancellation processing invalidates the electronic tickets that are stored in the member terminal A (9) of the person 41. After this processing, the server 5 performs processing of restoring pooling money of the person 41 corresponding to the ticket price (step S115). In this embodiment, as described above, the person 41 is not refunded the pooling money unless the canceled tickets are bought by another person.

There may occur a case that even the member 43 who was assigned the canceled tickets at step S103 no longer needs the tickets when receiving the e-mail for announcing that he has been assigned the canceled tickets. In this case, purchase intention is not confirmed at step S107 or assignment cancellation registration is performed at this stage. The tickets concerned may be subjected again to the assigning processing at step S103, or an e-mail for announcing the assignment of the canceled tickets may be sent to a substitute member who was not assigned the canceled tickets at step S103 (step S117).

Figure 9:
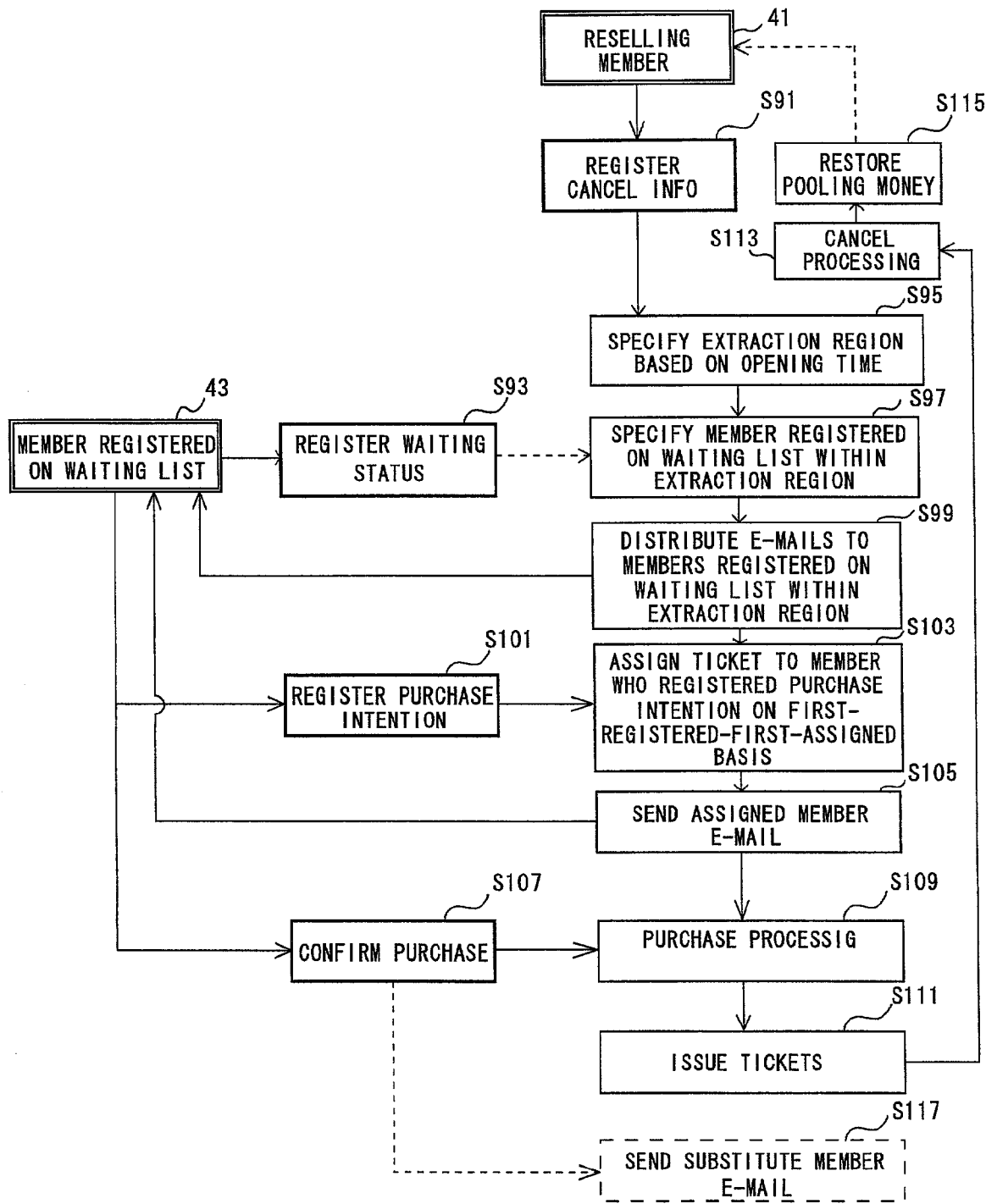
FIG. 9 is a flowchart showing a process that is executed in reselling canceled tickets until a time point immediately before the opening time of an event.

Steps S95-S115 shown in FIG. 9 are executed at prescribed intervals to the opening time, for example, every 30 minutes from three hours before the opening time to one hour before the opening time and every 10 minutes from one hour before the opening time. The extraction region that is specified at step S95 is narrowed as the time to the opening time becomes shorter.

With the above processing, a person 41 who wants to resell his tickets because he can no longer attend an event such as a concert for some reason can easily request cancellation of the tickets and the probability that members on a waiting list can attend the event is increased. Further, the use of the system according to the embodiment enables efficient redistribution of tickets.

Figure 13:
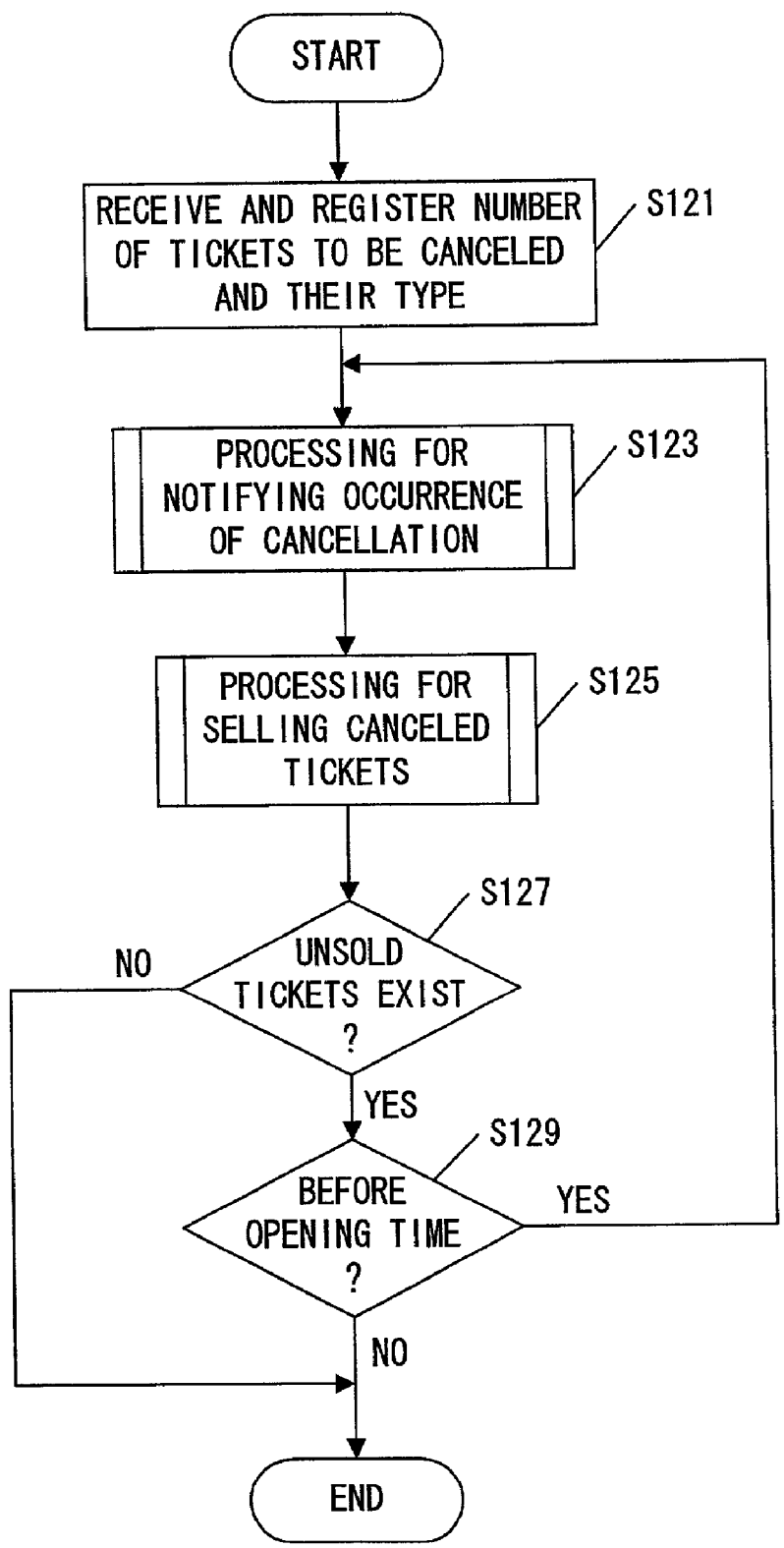
FIG. 13 is a flowchart showing a processing for determining destinations of the mail for notifying assignment of canceled tickets.

Next, the details of the process flow of FIG. 9 will be described. FIG. 13 outlines how the server 5 executes the process of FIG. 9. First, the server 5 receives, from a person who wants to resell his tickets, information of the number of tickets to be canceled and their kind and registers the received information as cancellation information (step S121). The server 5 performs processing of notifying members registered on the waiting list of the occurrence of cancellation (i.e., sending an e-mail for announcing resale of canceled tickets) (step S123). Then, the server 5 performs processing of selling the canceled tickets to a member who has registered purchase intention among the members who were notified of the occurrence of cancellation (step S125). The server 5 judges whether there remain unsold tickets (step S127). New cancellation may occur during the execution of steps S123 and S125. Therefore, whether there remain unsold tickets is judged in such a manner that newly canceled tickets are involved. If there remain no unsold tickets, the processing is finished. On the other hand, if there remain unsold tickets, the server 5 judges whether the present time is before the opening time (step S129). If the present time is before the opening time, the processing returns to step S123 to repeat the process every predetermined time.

Figure 14:
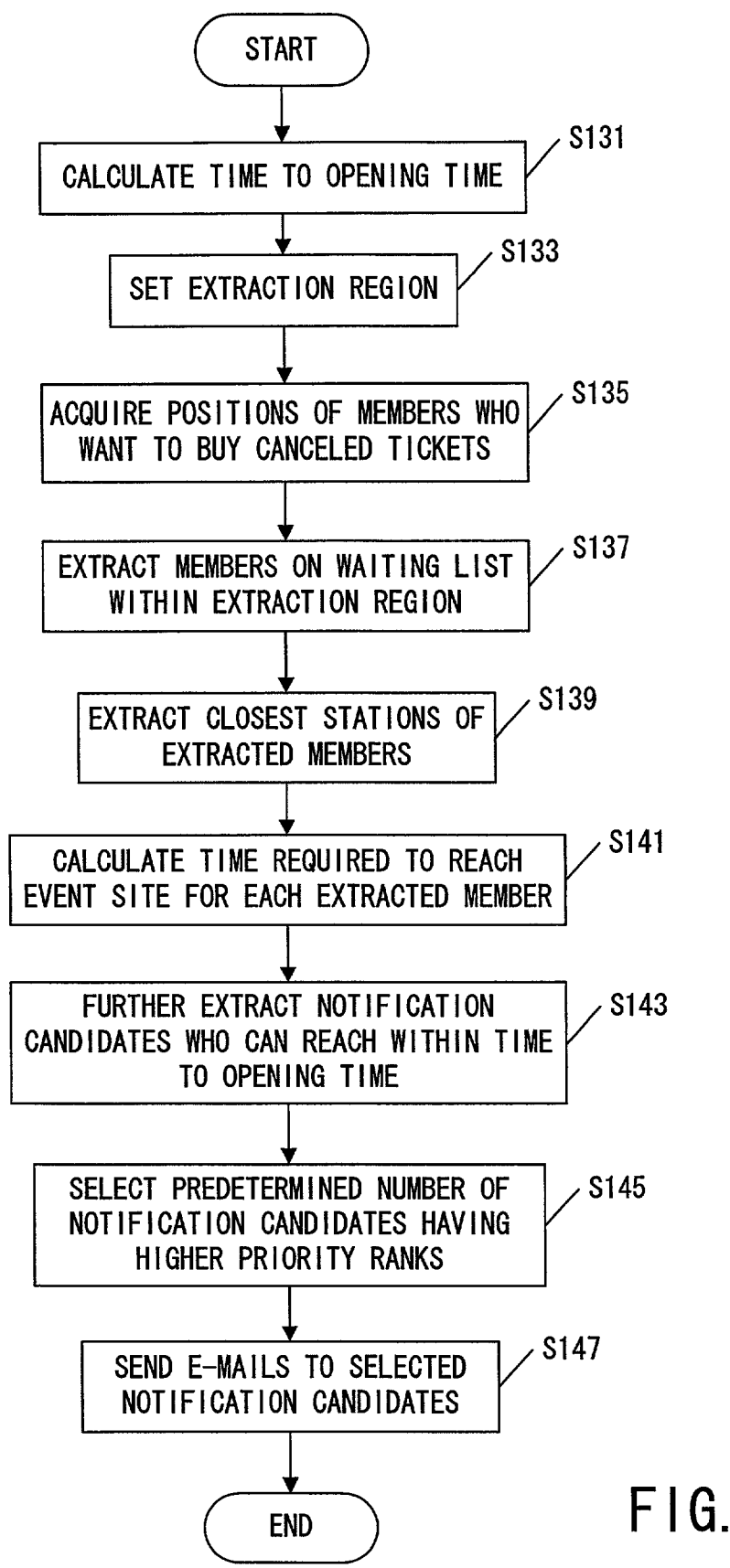
FIG. 14 is a flowchart showing a processing for notifying occurrence of canceled tickets.

Next, the details of step S123 shown in FIG. 13 will be described with reference to FIG. 14. Data shown in FIG. 15, for example, are stored in the event place position database 21 before the execution of the processing of FIG. 13 is started. That is, an event place name, an address, a latitude and a longitude, a closest station, and time required to reach the closest station are set in the event place position database 21. Information shown in FIG. 16, for example, is stored in the station position database 17 for each of stations near the event site (e.g., stations from which one can reach the station closest to the event site within six hours). That is, a station name, an address, a name of a railroad route, a latitude and a longitude, and time required to reach the station closest to the event site are stored in the station position database 17. An optimum route and fare information may also be stored in the station position BD 17. This information is used when purchase intention registration is performed (see FIG. 10).

Initial setting of a notification area for resale of canceled tickets is also performed. For example, as shown in FIG. 17, it is set to an area enclosed by a circle centered by the event site defined by its latitude and longitude and having a radius corresponding to 2 degrees. This is based on a calculation that 20 minutes×6=120 minutes (2 degrees) in which it is assumed that it takes one hour to move by rail between two locations that are distant from each other by 20 seconds in terms of latitude or longitude. This is just an example; the notification area for resale of canceled tickets is determined in consideration of an event site, transport means (e.g., a railroad network), highway network etc. Information that prescribes when the processing of FIG. 14 starts is also set. For example, as shown in FIG. 18, this information includes conditions of starts (the number of hours before the opening time), frequencies or processing timings (the number of times/hour), and also narrowing settings of notification area. In this example, the processing of FIG. 14 is executed once per hour from six hours before the opening time to three hours before the opening time while the notification area is narrowed by 20 minutes each time. The processing of FIG. 14 is executed twice per hour (i.e., every 30 minutes) from three hours before the opening time to one hour before the opening time while the notification area is narrowed by 10 minutes each time. The processing of FIG. 14 is executed six times per hour (i.e., every 10 minutes) from one hour before the opening time to immediately before the opening time while the notification area is narrowed by 3 minutes each time.

An area for persons who will go to the event site on foot without using a railroad or any other transport means is also set. For example, as shown in FIG. 19, the walk-accessible area is set to an area centered by the event site (defined by its latitude and longitude) and having a radius corresponding to 1 minute.

Information shown in FIG. 20, for example, is stored in the registration status database 19. That is, the number of times of waiting list registration and the number of times of purchase are stored for the member number of each member who is registered on a waiting list. Ranking of the members on the waiting list is determined by the number of times of registration. A list may be sorted according to another criterion.

The processing flow of FIG. 14 will now be described in detail. First, a time to the opening time is calculated according to (opening time)−(present time) (step S131). It is assumed here that the time to the opening time is one hour. Then, an extraction region for members on the waiting list is set in accordance with the time to the opening time (step S133). Specifically, a radius value (in terms of latitude or longitude; in this case, 20 minutes) corresponding to the time (one hour in this example) to the opening time is acquired by referring to the information shown in FIG. 18, for example. Then, position information of members registered on the waiting list (i.e., members who want to buy canceled tickets) is acquired from the position detector 31 of the carrier system 3, for example (step S135), and stored in the waiting member database 15. Information of a present position of each member who was registered on a waiting list is stored in the waiting member database 15 in the manner shown in FIG. 21, for example. That is, a member number (NO.), a member name, a present latitude and longitude, a closest station (this information is calculated at step S139 by the server 5 based on the present latitude and longitude), and present time are stored in the waiting list member database 15.

Then, members on the waiting list who exist within the extraction region are extracted by referring to the waiting member position database 15 (step S137). Then, closest stations of the extracted members are extracted (step S139). In this embodiment, a station whose distance in terms of latitude and longitude from the position of each member is shortest is set as a closest station. The extracted closest stations are registered in the waiting member position database 15 as mentioned above. Then, time required for each extracted member to reach the event site is calculated (step S141). This is done by searching the station position database 17 shown in FIG. 15 for a time required from a station closest to the present position to a station closest to the event site, by the closest station. Then, time required to move from the closest station of the event site to the event site is acquired by referring to the event place position database 21 and (time required to reach the closest station of the event site)+(time required to move from the closest station of the event site to the event site) is calculated Alternatively, (time required to move from the present position to a station closest to it)+(time required to move from the station closest to the present position to the closest station of the event site)+(time required to move from the closest station of the event site to the event site) may be calculated.

Then, members (hereinafter called notification candidates) whose time to reach the event site calculated above is within the time to the opening time (in this example, one hour) are extracted from the members who were extracted at step S137 (step S143). This step is necessary because members existing in the region enclosed by the circle having the prescribed radius are extracted automatically at step S137 but some of them may not be able to reach the event site by the opening time depending on traffic conditions etc. Then, a prescribed number of members having higher priority ranks are selected from the extracted notification candidates by referring to the registration status database 19 (step S145). If the number of extracted notification candidates is unduly large relative to the number of canceled tickets, there may occur a rush of access attempts to cause a failure in the server 5. Step S145 may be executed in such a case. An e-mail for announcing the resale of canceled tickets is sent to the selected notification candidates (step S147).

With the above processing, an announcement e-mail is sent to only members on the waiting list who can reach an event site by the opening time at a high probability. No announcement e-mail is sent uselessly to, for example, members who cannot reach the event site by the opening time, and useless access attempts from such members can be prevented, which makes it possible to resell canceled tickets smoothly.

Figure 22:
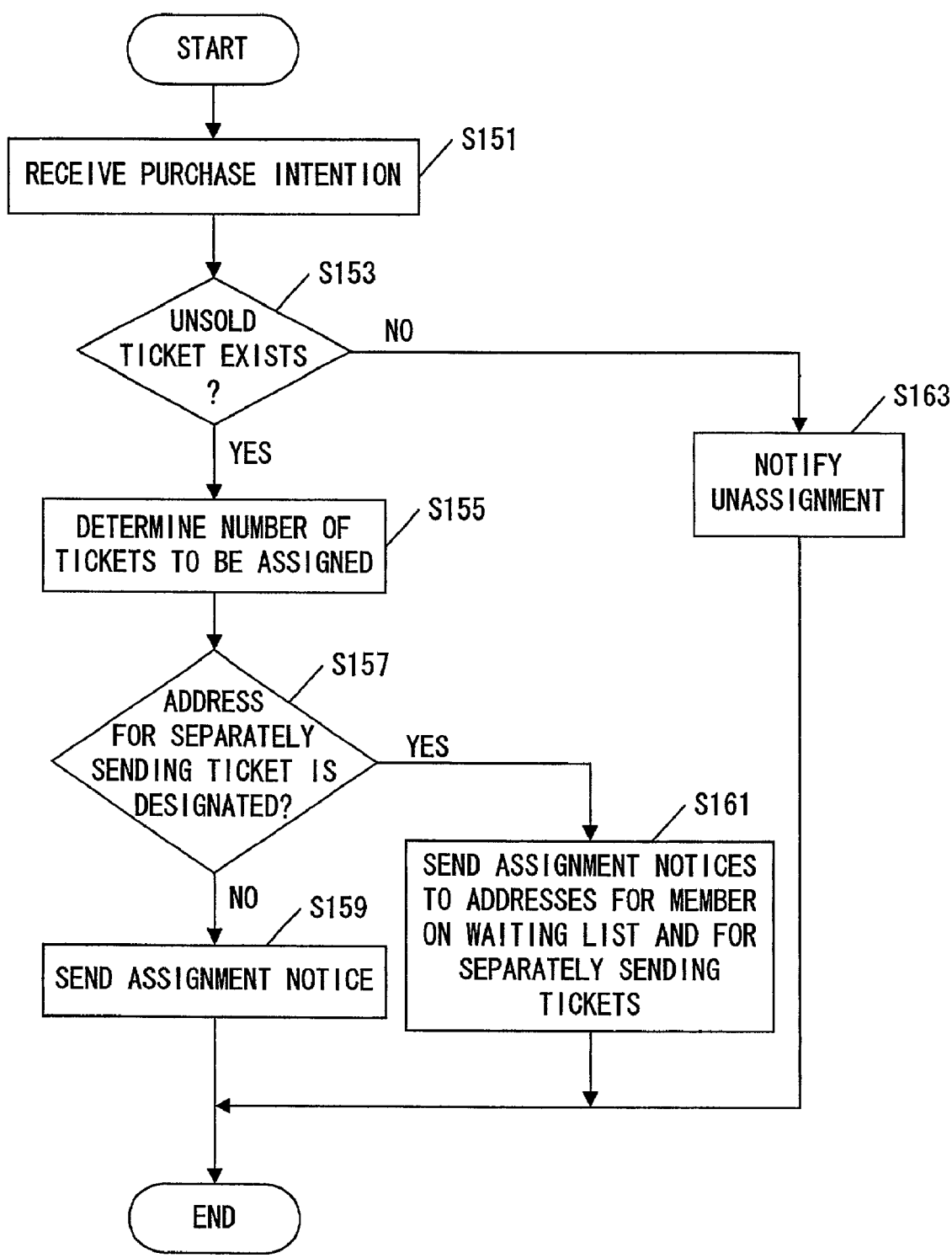
FIG. 22 is a flowchart showing a process of sending a mail for notifying an assignment result of canceled tickets.

Next, the details of step S125 shown in FIG. 13 will be described with reference to FIGS. 22 and 23. First, the server 5 receives registration information of purchase intention from the member terminal of a member on the waiting list who received an e-mail for announcing resale of canceled tickets (step S151). Since the canceled tickets are assigned on a first-registered-first-assigned basis, it is judged whether there remain unsold canceled tickets at this time point (step S153). At this stage, it is judged whether there remain unsold canceled tickets in a number that is larger than or equal to the minimum desired number that is included in the registration information of the purchase intention. If there remain unsold canceled tickets in a number that is larger than or equal to the minimum desired number, the server 5 performs processing of determining the number of tickets to be assigned to the member on the waiting list (step S155). Specifically, if the number of canceled tickets is larger than or equal to the desired number of the member on the waiting list, canceled tickets of the desired number are assigned to the member. If the number of canceled tickets is smaller than the desired number, all the remaining canceled tickets are assigned to the member.

Then, it is judged whether the registration information of the purchase intention includes designation of destination address(es) for separately sending tickets (step S157). If the registration information of the purchase intention does not include designation of destination address for separately sending tickets, an e-mail (having the contents of FIG. 11, for example) for announcing the assignment of canceled tickets is sent to only the member who registers purchase intention (step S159). On the other hand, if the registration information of the purchase intention includes designation of destination address for separately sending tickets, an e-mail for announcing the assignment of canceled tickets is sent to not only the address of the member who registers the purchase intention but also the other whose address (es) for separately sending tickets is designated (step S161).

On the other hand, if the number of unsold canceled tickets is smaller than the minimum desired number ("no" at step S153), an e-mail for announcing that no ticket has been assigned is sent to the member who registered the purchase intention(step S163).

A ticket issuing process will be described below with reference to FIG. 23. The member on the waiting list who has received an e-mail for announcing that canceled tickets have been assigned accesses a ticket issuance page of the server 5 by manipulating the member terminal B (7), for example (step S171). In response to this access, the server 5 sends web page data for inputting authentication information to the member terminal B (7) (step S173) The member terminal B (7) receives the web page data for inputting the authentication information from the server 5 and displays it on a display device (step S175). In response to this display, the member on the waiting list inputs his member ID and password and causes the member terminal B (7) to send them (step S177). The server 5 receives the member ID and the password and performs authentication processing by referring to the member DB 11 (step S179). If the member is not authenticated, the server 5 sends the member terminal B (7) a notice to that effect.

If the member is authenticated, the server 5 sends the member terminal B (7) web page data for causing the member to allow payment from his pooling money (step S181). For example, this web page data includes a remaining amount of pooling money of the member on the waiting list, which information retrieved from the member prepaid information database 13, the number of tickets, and a ticket price. The member terminal B (7) receives the web page data for causing the member to allow payment from his pooling money and displays it on the display device (step S183). If it is found that the pooling money is insufficient, the server 5 may notify the member at this stage that tickets cannot be issued. After checking the information on the screen, the member on the waiting list clicks an OK button if there is no problem or clicks a cancel button if he refrains from buying the tickets. In response to this click, the member terminal B (7) sends a response indicating OK or cancellation to the server 5 (step S185). The server 5 receives the response from the member terminal B (7) and confirms its content (step S187). If the response indicates cancellation, the server 5 sends a ticket non-issuance notice to the member terminal B (7).

If the decision information indicates OK, by referring to the member prepaid information database 13 the server 5 checks whether payment from the pooling money is possible (step S189). If the remaining amount of pooling money is insufficient, the server sends a ticket non-issuance notice to the member terminal B (7). The member terminal B (7) receives the ticket non-issuance notice and displays it on the display device (step S191).

If payment from the pooling money is possible, the server 5 performs processing of decreasing the pooling money and registers a resulting amount of pooling money in the member prepaid information database 13 (step S193). Then, the server 5 performs processing of generating ticket information using the information on the tickets concerned and the information on the member registered on the waiting list concerned, which is retrieved from the member database 191 (step S195). The server 5 sends the generated ticket information to the member terminal of the member on the waiting list (step S197). The member terminal B (7) receives the ticket information and stores it in a storage device (step S199). The system may be configured in such a manner that if a ticket price has been settled for a plurality of persons and the address(es) for separately sending tickets are designated, ticket information is also sent to the address (es). Still another configuration is possible in which the server 5 can send ticket information to a terminal having an address for designated as an address for separately sending ticket when receiving a request from that terminal.

Then, the server 5 sends web page data for showing process completion to the member terminal B (7) (step S201). The member terminal B (7) receives the web page data for showing the process completion and displays it on the display device (step S203).

Figure 23:
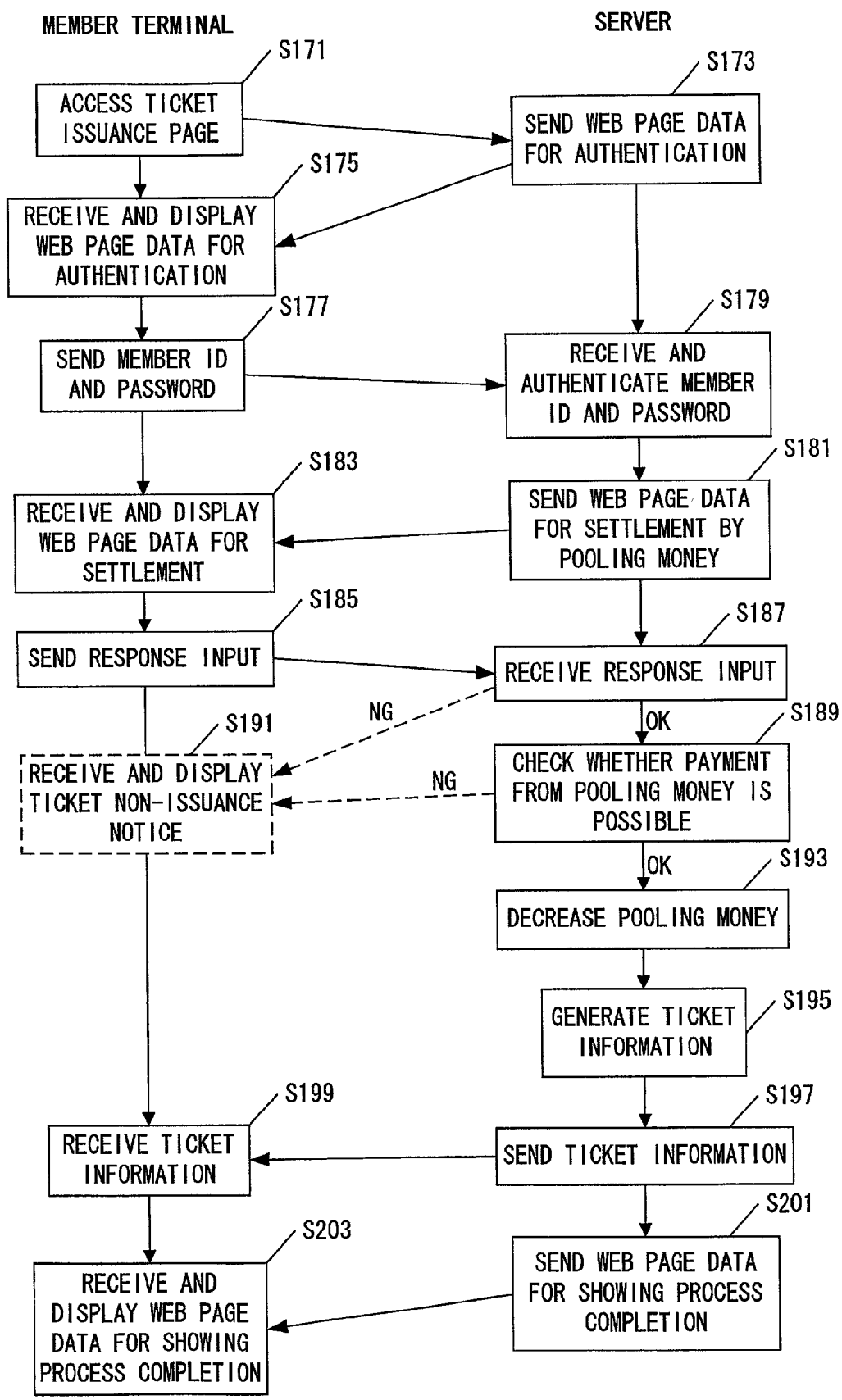
FIG. 23 is a flowchart showing a process of issuing tickets corresponding to canceled tickets.

A ticket issuing process other than the one shown in FIG. 23 may be employed. Specifically, a ticket price may be paid automatically from pooling money in response to a request for sending ticket information.

A specific example will be described below with reference to FIGS. 24-27. An event site is located at Oimachi, and its address, latitude, longitude, closest station, and time required to move there from the closest station are registered in the event place position database 21 as shown in FIG. 25. In this example, two closest stations are registered because of presence of two railroads. As shown in FIG. 26, information including a station name, an address, a name of a railroad route, a latitude, a longitude, and time required to reach the closest station of the event site on each of stations in and around Oimachi are registered in the station position database 17.

It is assumed that members registered on the waiting list exist near Tokyo Station (where a member of No. 001 exits), Tennouzu Isle Station (where a member of No. 111 exists), Kamata Station (where a member of No. 200 exists), Musashi-Nakahara Station (where a member of No. 077 exists), and Kaihin-Makuhari Station (where a member of No. 123 exists), respectively. Position information of each of members on the waiting list is sent from the position detector 31 of the carrier system 3 to the server 5 and registered in the waiting member position database 15 as shown in FIG. 27. It is noted that the server 5 registers, as closest stations of the respective members registered on the waiting list, stations closest to the present positions of the respective members registered on the waiting list.

Figure 24:
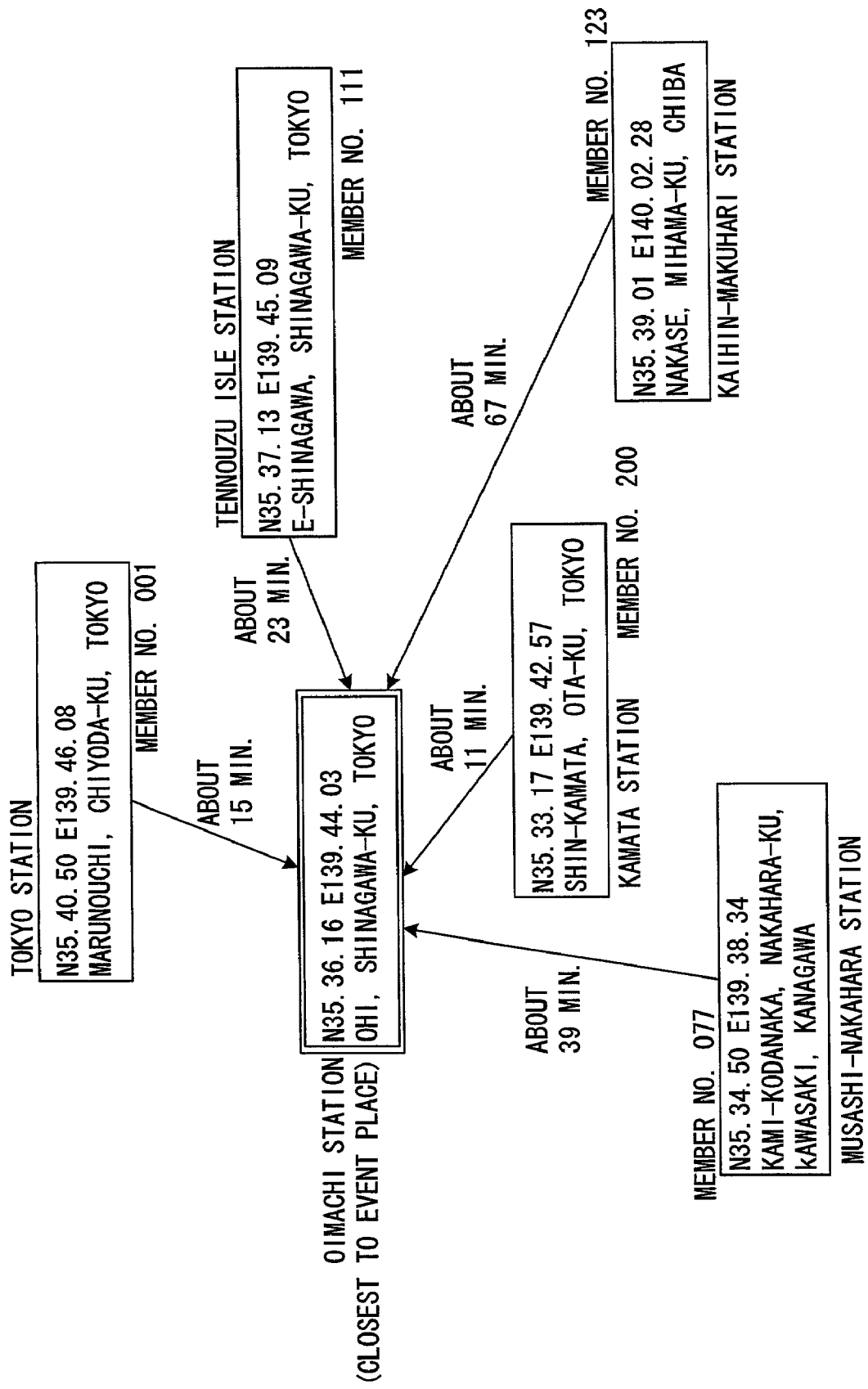
FIG. 24 illustrates a specific example of the embodiment.

If the present time is 50 minutes before the opening time, an e-mail for announcing resale of canceled tickets are sent to the members on the waiting list who exist near Tokyo Station, Tennouzu Isle Station, Kamata Station, and Musashi-Nakahara Station. This is because these members can reach the event site in time for the opening; as shown in FIG. 24, the member of No. 001 existing near Tokyo Station can reach the event site in 20 (15+5) minutes, the member of No. 111 existing near Tennouzu Isle Station can reach the event site in 28 (23+5) minutes, the member of No. 200 existing near Kamata Station can reach the event site in 16 (11+5) minutes, and the member of No. 077 existing near Musashi-Nakahara Station can reach the event site in 44 (39+5) minutes. On the other hand, no announcement mail is sent to the member of No. 123 existing near Kaihin-Makuhari Station because it takes him 72 (67+5) minutes to reach the event site and hence cannot reach the event site in time for the opening.

If the members remain at the same positions 30 minutes before the opening time, an announcement mail is sent to the members on the waiting list existing near Tokyo Station, Tennouzu Isle Station, and Kamata Station but no announcement mail is sent to the member existing near Musashi-Nakahara Station. At a time point 20 minutes before the opening time, an announcement mail is sent to only the members on the waiting list who exist near Tokyo Station and Kamata Station.

Although the one embodiment of the invention has been described above, various modifications are possible. For example, while in the embodiment position information of a member terminal is acquired by the position detector 31 of the carrier system 3, position information generated by a GPS (global positioning system) device may be used if a member terminal is equipped with the GPS device. Position information of a member terminal may be acquired by some other method.

Although the embodiment is applied to an event such as a concert, the invention can also be applied to a case of distributing mails for announcing a time-restricted sale of a store that sells goods, that is, a case of sending announcement mails to registered members who can reach the store by the start time or end time of the time-restricted sale. Further, although the embodiment is directed to the case of reselling canceled tickets, the invention is not limited to such a case and can be applied to cases of selling any kinds of unsold tickets.

Although the embodiment is directed to the case of announcing an assignment result of the canceled tickets by e-mail, a configuration is possible in which an assignment result is announced in real time at the time of purchase intention registration.

The server 5 may be formed by either a single computer or a plurality of computers.

In the embodiment, destination address for separately sending tickets can be designated as shown in FIG. 10. There may occur a case that a person having the destination address for separately sending tickets should also pay a ticket price. In such a case, the same process as the above-described ticket issuing process for a person who requested tickets is executed. Settlement means using a credit card or the like may be employed. On the other hand, a configuration is possible in which where a person having the destination address for separately sending tickets does not pay a ticket price, a mail to the effect that electronic tickets can be downloaded is sent and then the electronic tickets are sent without payment after authentication processing is performed by using authentication information (e.g., an ID and a password) that is included in the e-mail.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An event invitation method comprising:
   acquiring position information of a customer registered in advance;
   judging whether or not an invitation to an event is to be sent to a terminal of said customer based on at least a positional relationship between said customer and a site of the event;
   sending information concerning said invitation to said event to a terminal of said customer if it is judged that said invitation to said event should be sent to said customer;
   receiving from a terminal of said customer, an attendance request for a plurality of persons, said attendance request including information of respective destinations to which information concerning an entrance ticket should be sent;
   judging whether or not entrance tickets are assigned to said plurality of persons for said attendance request; and
   if it is judged that said entrance tickets are assigned to at least said plurality of persons, sending said information concerning said entrance ticket to respective terminals of said plurality of persons according to said information of said respective destinations.

2. The event invitation method as set forth in claim 1, further comprising:
   receiving cancellation of a ticket from a customer; and
   performing processing of refunding a corresponding amount of money to said customer who canceled said ticket in response to an issuance of a ticket corresponding to said canceled ticket to another customer.

3. A program embedded on a medium when executed by a computer for causing said computer to perform a processing for invitation of an event, said program comprising:
   acquiring position information of a customer registered in advance;
   judging whether or not an invitation to an event is to be sent to a terminal of said customer based on at least a positional relationship between said customer and a site of the event;
   sending information concerning said invitation to said event to said terminal of said customer if it is judged that said invitation to said event should be sent to said customer;
   receiving from a terminal of a customer, an attendance request for a plurality of persons, said attendance request including information of respective destinations to which information concerning an entrance ticket should be sent;
   judging whether or not entrance tickets can be assigned to said plurality of persons for said attendance request; and
   if it is judged that said entrance tickets can be assigned to at least said plurality of persons, sending said information concerning said entrance ticket to respective terminals of said plurality of persons according to said information of said respective destinations.

4. An event invitation system, comprising:
   means for acquiring position information of a customer registered in advance;
   means for judging whether or not an invitation to an event is to be sent to a terminal of said customer based on at least a positional relationship between said customer and a site of the event;
   means for sending information concerning said invitation to said event to said terminal of said customer if it is judged that said invitation to said event should be sent to said customer;
   means for receiving from a terminal of a customer, an attendance request for a plurality of persons, said attendance request including information of respective destinations to which information concerning an entrance ticket should be sent;

means for judging whether or not entrance tickets can be assigned to said plurality of persons for said attendance request; and sending said information concerning said entrance ticket to respective terminals of said plurality of persons according to said information of said respective destinations, if it is judged that said entrance tickets can be assigned to at least said plurality of persons.

* * * * *